US010910920B2

(12) United States Patent
Torrey et al.

(10) Patent No.: US 10,910,920 B2
(45) Date of Patent: Feb. 2, 2021

(54) MAGNETIC SHIELD FOR A SUPERCONDUCTING GENERATOR

(71) Applicant: General Electric Company, Schenectady, NY (US)

(72) Inventors: David Allan Torrey, Ballston Spa, NY (US); Nidhishri Tapadia, Arvada, CO (US); Joseph Zierer, Niskayuna, NY (US); Anbo Wu, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 78 days.

(21) Appl. No.: 16/400,253

(22) Filed: May 1, 2019

(65) Prior Publication Data
US 2020/0350805 A1 Nov. 5, 2020

(51) Int. Cl.
*H02K 11/01* (2016.01)
*H02K 55/04* (2006.01)
(Continued)

(52) U.S. Cl.
CPC ............ *H02K 11/01* (2016.01); *F03D 1/065* (2013.01); *H02K 55/04* (2013.01); *H02K 11/012* (2020.08); *H02K 11/02* (2013.01); *H02K 11/028* (2013.01)

(58) Field of Classification Search
CPC ...... H02K 11/01; H02K 55/04; H02K 11/012; H02K 11/02; H02K 11/022; H02K 11/028; F03D 1/065
(Continued)

(56) References Cited

U.S. PATENT DOCUMENTS 3,742,265 A * 6/1973 Smith, Jr. .............. H02K 55/00
310/52
3,764,835 A 10/1973 Luck et al.
(Continued)

FOREIGN PATENT DOCUMENTS

EP 0243425 B1 12/1990
EP 1959548 A1 8/2008
(Continued)

OTHER PUBLICATIONS

Kuznetsov, S., "Conductive Armature Shielding Design Concepts for Slow-Speed Superconducting Generators in the 40- to 400-MVA Range", Advances in Cryogenic Engineering, vol. 35A, pp. 145-155, 1980.
(Continued)

*Primary Examiner* — Alex W Mok
(74) *Attorney, Agent, or Firm* — Dority & Manning, P.A.

(57) ABSTRACT

An annular rotating armature is presented. The annular rotating armature includes an armature winding having a plurality of coils, an armature support structure and a magnetic shield disposed between the armature winding and the armature support structure. The magnetic shield having a first magnetic shield ring, a second magnetic shield ring disposed concentric to the first magnetic shield ring and coupled to the first magnetic shield ring via a magnetic shield bridge link. An air gap is formed between the first magnetic shield ring and the second magnetic shield ring. The magnetic shield bridge link is disposed within the air gap. A superconducting generator including the annular rotating armature and a wind turbine having such superconducting generator are also presented.

20 Claims, 6 Drawing Sheets

(51) Int. Cl.
*F03D 1/06* (2006.01)
*H02K 11/028* (2016.01)
*H02K 11/02* (2016.01)

(58) Field of Classification Search
USPC ...................................................... 310/40 R
See application file for complete search history.

(56) References Cited

U.S. PATENT DOCUMENTS

| | | | | |
|---|---|---|---|---|
| 3,934,163 A | | 1/1976 | Mailfert | |
| 3,942,053 A | * | 3/1976 | Abolins | H02K 55/04 310/52 |
| 3,944,865 A | * | 3/1976 | Jewitt | H02K 55/06 310/178 |
| 4,034,245 A | | 7/1977 | Mailfert et al. | |
| 4,076,988 A | * | 2/1978 | Litz | H02K 55/04 310/52 |
| 4,123,676 A | * | 10/1978 | Cooper | H02K 55/04 310/52 |
| 4,152,609 A | * | 5/1979 | Cooper | H02K 55/04 310/52 |
| 5,032,748 A | * | 7/1991 | Sakuraba | H02K 55/06 310/52 |
| 6,995,562 B2 | | 2/2006 | Laskaris et al. | |
| 7,375,526 B2 | | 5/2008 | Edelstein et al. | |
| 8,084,909 B2 | * | 12/2011 | Goodzeit | H02K 55/00 310/112 |
| 9,655,291 B2 | | 5/2017 | Ozaki et al. | |
| 10,079,534 B2 | * | 9/2018 | Morrison | H02K 9/19 |
| 2008/0161189 A1 | | 7/2008 | Lewis et al. | |
| 2011/0148238 A1 | * | 6/2011 | Goodzeit | H02K 55/02 310/126 |
| 2016/0276918 A1 | | 9/2016 | Morrison | |
| 2016/0365183 A1 | | 12/2016 | Nishimukra et al. | |

FOREIGN PATENT DOCUMENTS

| | | | | |
|---|---|---|---|---|
| EP | 3012945 A2 | | 4/2016 | |
| JP | 04334966 A | * | 11/1992 | |
| JP | 11206105 A | * | 7/1999 | |
| JP | 11235010 A | * | 8/1999 | |
| JP | 2000253645 A | * | 9/2000 | |
| JP | 2004266988 A | * | 9/2004 | H02K 55/04 |
| JP | 2005033852 A | | 2/2005 | |

OTHER PUBLICATIONS

Zielenski, A., "In-Bore Magnetic Field Management", Defense Technical Information Center, pp. 1-45, Mar. 1999.

Pratap, S.B., "Transient eddy current distribution in the shield of the passively compensated compulsator-air-core machines", IEEE Transactions on Magnetics, vol. 27 Issue: 4, pp. 3710-3720, Jul. 1991.

European Search Report, dated Sep. 23, 2020, for EP Application No. 20172763.3.

* cited by examiner

FIG. 8

MAGNETIC SHIELD FOR A SUPERCONDUCTING GENERATOR

BACKGROUND

Embodiments of the present specification generally relate to a superconducting generator and in particular, to a magnetic shield for a superconducting generator for use in a wind turbine.

Conventional superconducting machines such as a conventional superconducting generator typically includes a field winding and an armature. The armature includes a traditional ferromagnetic core and an armature winding disposed on the traditional ferromagnetic core. The conductive armature winding is generally formed using conventional materials, for example, copper or aluminum. Whereas, the field winding includes superconducting wires that support very high current densities without incurring any dissipation. The conventional superconducting generator, when operated, and more particularly the superconducting wires, generate very high magnetic field, for example, on the order of 7 Tesla or larger due to the high current densities in the field winding. Hence, electric machines with superconducting field coils offer substantially greater torque density than conventional machines. In applications where, minimizing generator size and weight are important, the use of a superconducting field winding can be extremely valuable. Off-shore wind turbines are such an application since the mass on top of the tower has significant influence on the tower and foundation cost.

Magnetic shields have traditionally been used to encourage the magnetic field produced by the superconducting field winding to remain in the radial direction as it passes through the conductive armature winding. By encouraging the magnetic field to remain in the radial direction, maximum coupling between the field winding and armature winding is achieved. Maximizing this coupling is tantamount to maximizing the torque density and efficiency of the electric machine. To provide such coupling, known magnetic shields are typically comprised of a laminated structure that is placed behind the conductive armature winding, so as to position the conductive armature winding between the field winding and the magnetic shield.

Virtually all of the benefit from the magnetic shield is achieved by allowing the magnetic shield to be heavily saturated. Being a laminated structure made of ferromagnetic material and with substantial magnetic saturation, the magnetic shield is the heaviest component within the armature. Accordingly, it will be appreciated that minimizing the radial thickness of the magnetic shield is desirable to minimize the weight of the magnetic shield.

BRIEF DESCRIPTION

In accordance with one embodiment of the present disclosure, an armature for an electrical machine is presented. The armature includes an armature support structure, a magnetic shield including a first magnetic shield ring, a second magnetic shield ring and a magnetic shield bridge link. The armature winding includes a plurality of coils and is disposed relative to the armature support structure. The magnetic shield is disposed concentric to the armature support structure, between the armature winding and the armature support structure. The second magnetic shield ring is disposed concentric to the first magnetic shield ring. The first magnetic shield ring is disposed a distance from the second magnetic shield ring to define an air gap therebetween. The magnetic shield bridge link is disposed in the air gap and coupled to the first magnetic shield ring and the second magnetic shield ring.

In accordance with another embodiment of the present disclosure, an electric machine is presented. The electric machine includes a stationary field, a superconducting field winding disposed on the stationary field and an armature disposed concentric to the stationary field. The armature includes an armature winding, an armature support structure and a magnetic shield. The armature winding including a plurality of coils, wherein each coil of the plurality of coils is spaced apart from adjacent coils. The armature winding is disposed concentric to the armature support structure. The magnetic shield is disposed concentric to the armature support structure and between the armature winding and the armature support structure. The magnetic shield includes a first magnetic shield ring, a second magnetic shield ring and an air gap. The second magnetic shield ring is disposed concentric to the first magnetic shield ring and coupled to the first magnetic shield ring via a magnetic shield bridge link. The air gap is formed between the first magnetic shield ring and the second magnetic shield ring. The magnetic shield bridge link is disposed within the air gap.

In accordance with yet another embodiment of the present disclosure, a wind turbine is presented. The wind turbine includes a rotor comprising a plurality of blades, a shaft coupled to the rotor and a super-conducting generator coupled to the rotor via the shaft and configured to be operated via the rotor. The superconducting generator includes a stationary field, a superconducting field winding disposed on the stationary field and an armature disposed concentric to the stationary field. The armature includes an armature winding, an armature support structure and a magnetic shield. The armature winding includes a plurality of coils, wherein each coil of the plurality of coils is spaced apart from adjacent coils. The armature winding is disposed concentric to the armature support structure. The magnetic shield is disposed between the armature winding and the armature support structure. The magnetic shield including a first magnetic shield ring, a second magnetic shield ring and an air gap. The second magnetic shield ring is disposed concentric to the first magnetic shield ring and coupled to the first magnetic shield ring via a magnetic shield bridge link. The air gap is formed between the first magnetic shield ring and the second magnetic shield ring. The magnetic shield bridge link is disposed within the air gap.

DRAWINGS

These and other features, aspects, and advantages of the present specification will become better understood when the following detailed description is read with reference to the accompanying drawings in which like characters represent like parts throughout the drawings, wherein.

DETAILED DESCRIPTION

In an effort to provide a concise description of these embodiments, all features of an actual implementation may not be described in the specification. It should be appreciated that in the development of any such actual implementation, as in any engineering or design project, numerous implementation-specific decisions may be made to achieve the developer's specific goals such as compliance with system-related and business-related constraints.

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The use of "including," "comprising," or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

As will be described in detail hereinafter, a wind turbine is presented. The wind turbine includes a rotor having a plurality of blades. The wind turbine further includes a shaft coupled to the rotor and superconducting generator coupled to the rotor via the shaft and configured to be operated via the rotor. In some embodiments, the superconducting generator includes a stationary field, a superconducting field winding disposed on the stationary field, and an armature disposed concentric to the stationary field.

In an embodiment, the armature includes an armature winding having a plurality of coils, an armature support structure and a magnetic shield disposed between the conductive armature winding and the armature support structure. The magnetic shield includes a first magnetic shield ring coupled to second magnetic shield ring via a magnetic shield bridge link disposed in an air gap. The air gap reduces eddy current loss in an armature support structure by encouraging the magnetic field to remain in the first magnetic shield ring. Any magnetic field that passes through the first magnetic shield ring is addressed by the second magnetic shield ring and remains therein, thereby keeping any residual magnetic flux from penetrating into the armature support structure where it can generate substantial loss. The magnetic shield therefore enables the control of the magnetic field that is seen by the armature support structure and the associated dissipation therein. In addition, the magnetic shield limits the electromagnetic loss in the armature support structure.

Figure 1:
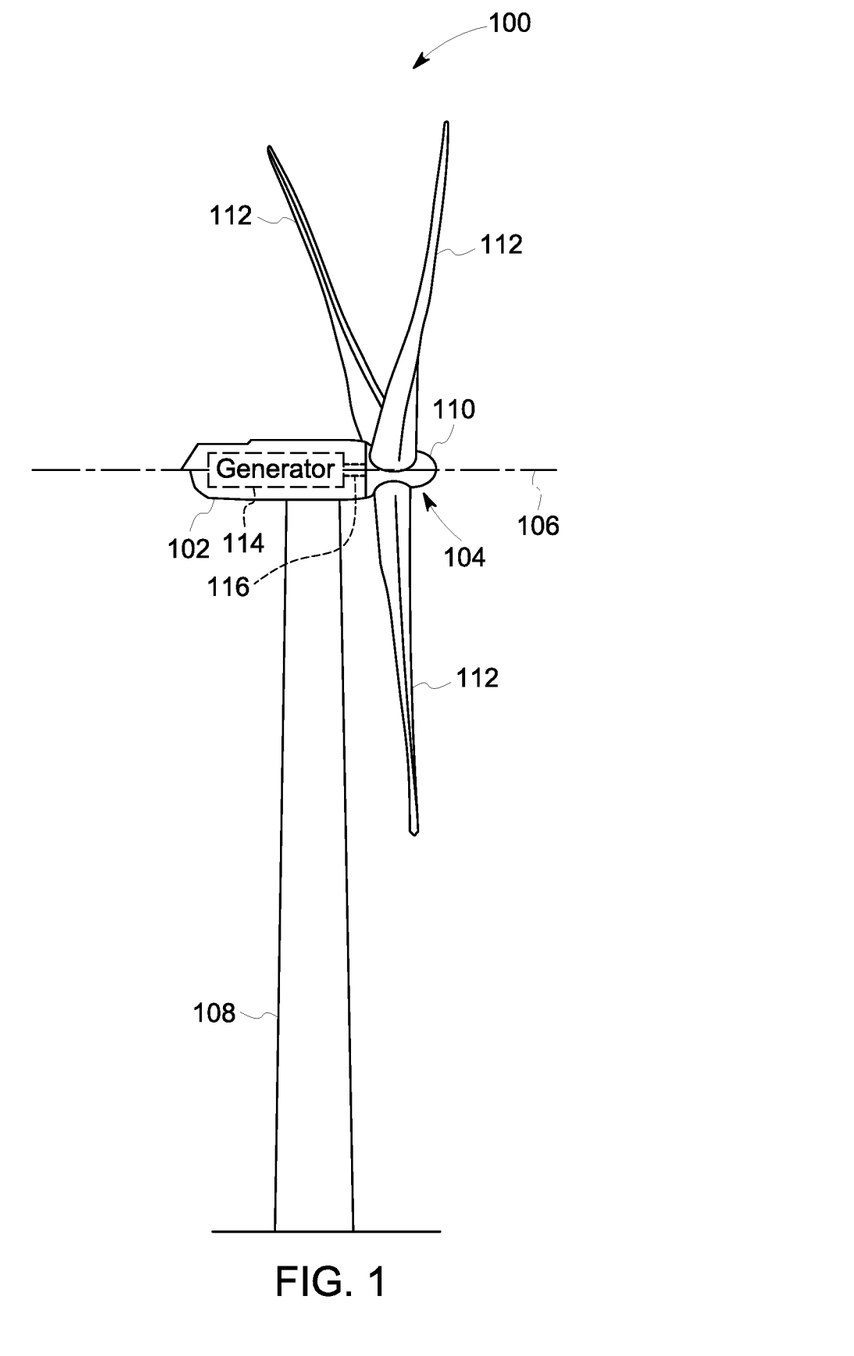
FIG. 1 is a schematic diagram of an example wind turbine, in accordance with one or more embodiments of the present disclosure.

Referring now to FIG. 1, a schematic diagram of an example wind turbine 100 is presented, in accordance with one embodiment of the present specification. The wind turbine 100 may be configured to generate electrical power using wind energy. The wind turbine 100 described and illustrated in the embodiment of FIG. 1 includes a horizontal-axis configuration. However, in some embodiments, the wind turbine 100 may include, in addition or alternative to the horizontal-axis configuration, a vertical-axis configuration (not shown). The wind turbine 100 may be coupled to, such as, but not limited to, a power grid, for receiving electrical power therefrom to drive operation of wind turbine 100 and/or its associated components and/or for supplying electrical power generated by the wind turbine 100 thereto. The wind turbine 100 may be coupled to an electrical load (not shown) to supply electrical power generated by the wind turbine 100 thereto to the electrical load.

The wind turbine 100 may include a body 102, sometimes referred to as a "nacelle," and a rotor 104 coupled to the body 102. The rotor 104 is configured to rotate with respect to the body 102 about an axis of rotation 106. In the embodiment of FIG. 1, the nacelle 102 is shown as mounted on a tower 108. However, in some other embodiments, the wind turbine 100 may include a nacelle that may be disposed adjacent to the ground and/or a surface of water.

The rotor 104 may include a hub 110 and a plurality of blades 112 (sometimes referred to as "airfoils") extending radially outwardly from the hub 110 for converting wind energy into rotational energy. Although the rotor 104 is described and illustrated herein having three blades 112, the rotor 104 may have any number of blades 112. The rotor 104 may have blades 112 of any shape and may have blades 112 of any type and/or any configuration, whether such shape, type, and/or configuration is described and/or illustrated herein.

In some embodiments, the nacelle 102 may house, fully or partially, one or more of a superconducting generator 114 and a shaft 116. The super-conducting generator 114 may be coupled to the rotor 104 via the shaft 116 and configured to be operated via the rotor 104. For example, rotations of the rotor 104 caused due to the wind energy in turn cause a rotary element (e.g., an armature) of the generator 114 to rotate via the shaft 116. In some embodiments, the shaft 116 may also include a gear box (not shown). In certain embodiments, use of the gear box may increase an operating speed of the superconducting generator 114 and reduce the torque requirement for a given power level. The presence or absence of a gearbox is immaterial to the generator embodiments disclosed here.

The superconducting generator 114 is configured to generate electrical power based at least on the rotations of the armature. In accordance with some embodiments described herein, the superconducting generator 114 may be configured to handle increased magnitudes of electrical field current in comparison to traditional generators. The superconducting generator 114 may be implemented in the form of a synchronous generator. The superconducting generator 114 will be described in greater details in conjunction with FIGS. 3-5.

Figure 2:
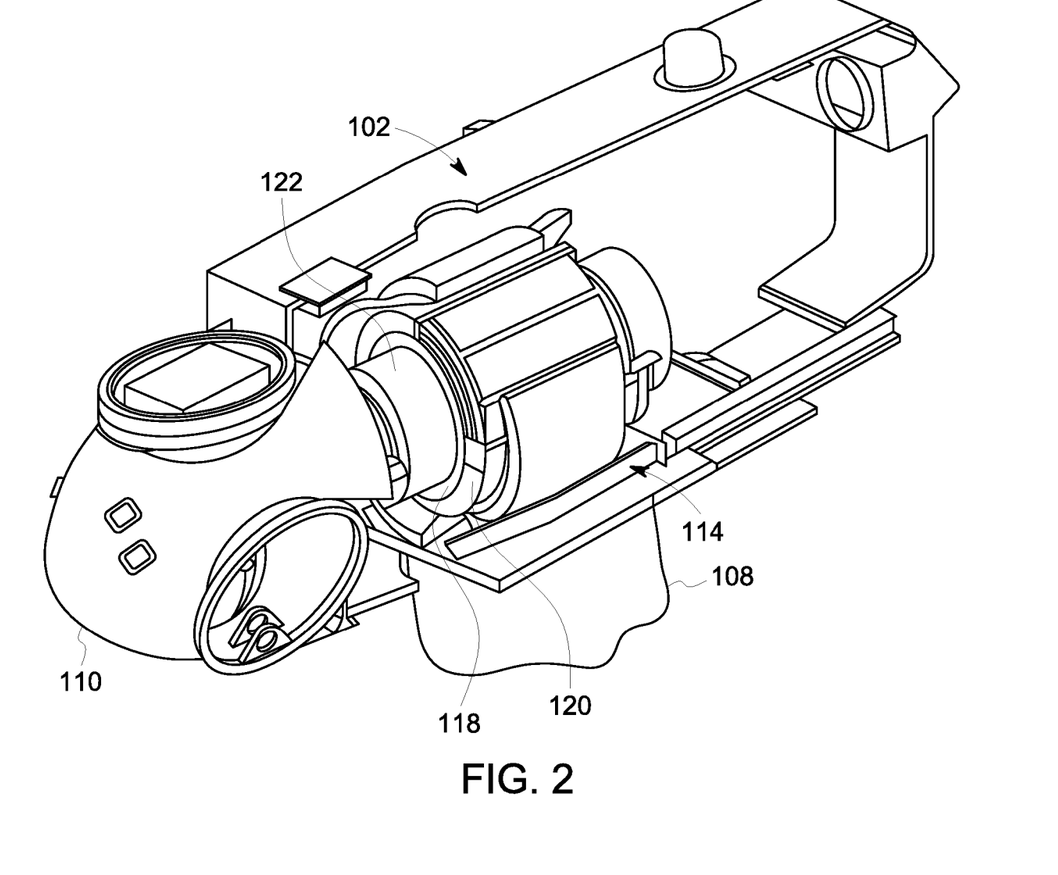
FIG. 2 is a cut-away view of a superconducting generator housed in a wind turbine nacelle and coupled to a hub of the wind turbine shown in FIG. 1, in accordance with one or more embodiments shown or described herein.

FIG. 2 is a cut-away view of the nacelle 102 and hub 110 of FIG. 1 showing the superconducting generator 114, in accordance with one embodiment of the present disclosure. The superconducting generator 114 may be representative of one embodiment of a superconducting generator for use in the wind turbine 100 of FIG. 1. The superconducting generator 114 is housed in the nacelle 102 and coupled to the hub 110. The superconducting generator 114 includes a stationary field 120 (stator) and an annular rotating armature 118 (rotor), which is surrounded by the stationary field 120. Specifically, the stationary field 120 is an outer annular ring disposed co-axially around the annular rotating armature 118. In the illustrated embodiment, the annular rotating armature 118 is rotatable and the stationary field 120 is stationary. In an alternate embodiment, the armature may be stationary and the field assembly rotatable. The superconducting generator 114 described here uses magnetic fields that are radially oriented. It will be appreciated that the magnetic fields could also be oriented axially and accomplish the same effect. Therefore, the embodiments described here, in the context of a radial field machine, also have an axial field machine counterpart.

A support tube 122 is coupled to the hub 110 and to the annular rotating armature 118, wherein the stationary field 120 is coaxial with annular rotating armature 118. The stationary field 120 is configured to receive a cooling agent (not shown).

Figure 3:
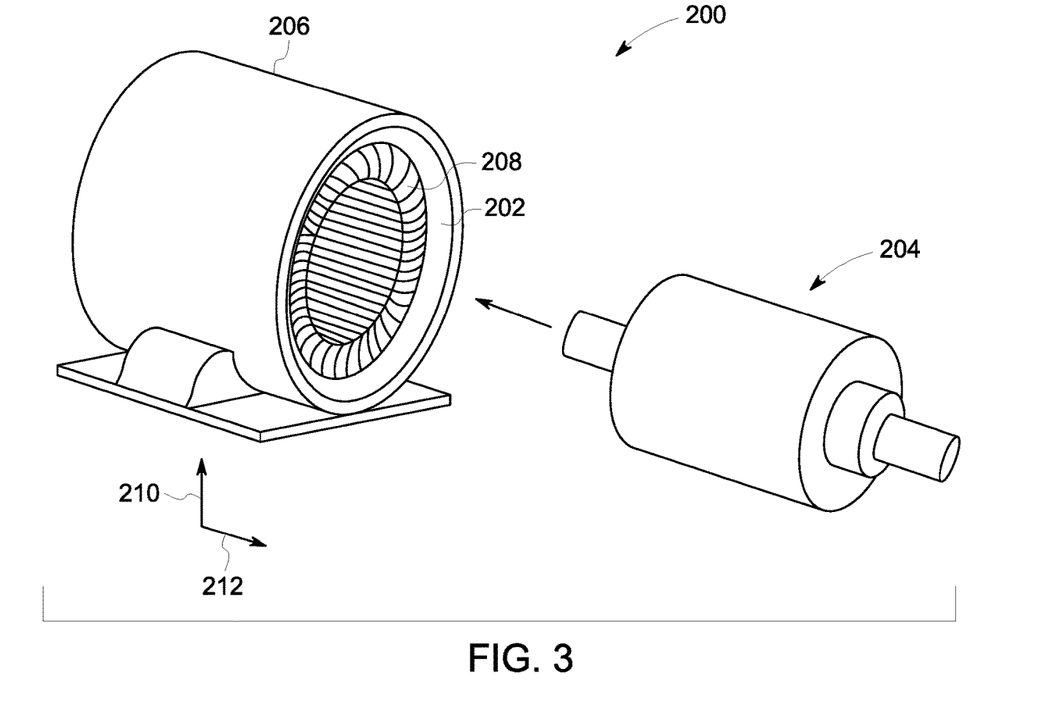
FIG. 3 is a schematic diagram of a superconducting generator illustrating the armature separately from the stationary field, in accordance with one or more embodiments of the present disclosure.
Figure 4:
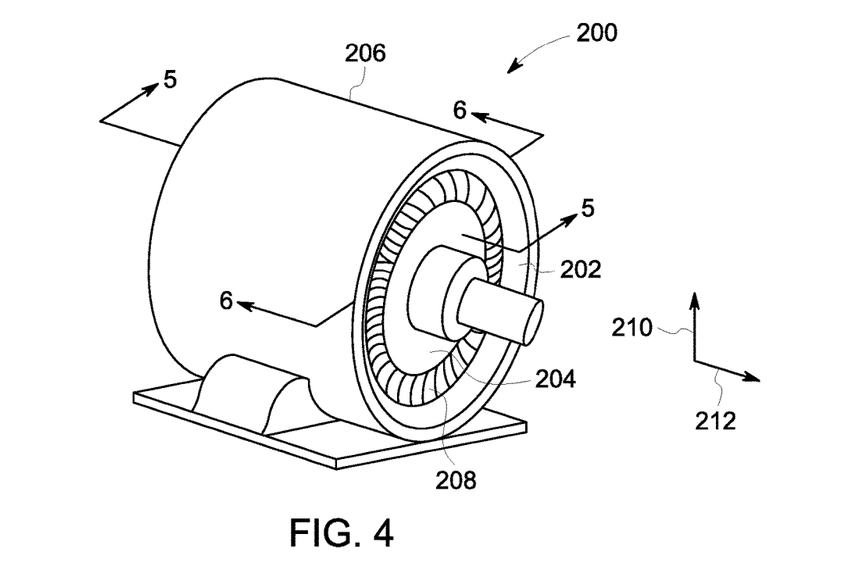
FIG. 4 is a schematic diagram of a superconducting generator illustrating the field winding disposed about the armature and including a magnetic shield, in accordance with one or more embodiments of the present disclosure.

FIGS. 3 and 4 are schematic diagrams of a superconducting generator 200, in accordance with one embodiment of the present specification, in a disassembled (FIG. 3) configuration and an assembled (FIG. 4) configuration. The superconducting generator 200 may be representative of one embodiment of the superconducting generator 114 used in the wind turbine 100 of FIG. 1. Without limiting the scope of the present application, the superconducting generator 200 may be used in any application other than wind turbines, such as, motors or generators, for example in an application where the generator is driven by a gas turbine. Although the superconducting generator 200 depicted in FIGS. 3 and 4 is a radial field electric machine, embodiments of the present specification are also applicable to axial field or transverse field superconducting generators. Reference numerals 210 and 212, respectively, represent a radial direction and an axial direction of the superconducting generator 200.

As depicted in FIGS. 3 and 4, the superconducting generator 200 includes a stationary field 202 and an annular rotating armature 204 disposed in a housing 206. In particular, FIG. 3 depicts an exploded view of the superconducting generator 200 to separately show the stationary field 202 and the annular rotating armature 204.

The stationary field 202 is disposed adjacent to the annular rotating armature 204. As used herein, the term "disposed adjacent to" with respect to positioning of the stationary field 202 and the annular rotating armature 204, refers to relative positioning of the stationary field 202 and the annular rotating armature 204 such that the annular rotating armature 204 is surrounded by the stationary field 202 (as illustrated in FIG. 4), in one embodiment. In another embodiment, the term "disposed adjacent to" refers to relative positioning of the stationary field 202 and the annular rotating armature 204 such that the stationary field 202 is surrounded by the annular rotating armature 204 (not shown). In yet another embodiment, the term "disposed adjacent to" refers to relative positioning of the stationary field 202 and the annular rotating armature 204 such that the stationary field 202 and the annular rotating armature 204 are disposed side-by-side (not shown).

Further, the superconducting generator 200 may also include a superconducting field winding 208 disposed on the stationary field 202. The superconducting field winding 208 may include one or more coils made using electrically conductive materials that transition to a superconducting state at sufficiently low temperatures. Such materials include niobium tin alloy, niobium titanium alloy, magnesium diboride alloy, any of a number of ceramic materials that have exhibited superconducting properties, or combinations thereof. Often electrically conductive materials including, such as, but not limited to, copper, aluminum, anodized aluminum, silver, gold, or combinations thereof are used in combination with superconducting alloys for improved mechanical properties. In certain embodiments, low weight electrically conductive materials may be used to increase or at least maintain a power density of the superconducting generator 200. In some embodiments, the superconducting generator 200 may also include suitable arrangement (not shown) for cooling the superconducting field winding 208 to cryogenic temperatures.

By way of example, in some embodiments, when the superconducting generator 200 is deployed as the superconducting generator 114 in the wind turbine 100, the annular rotating armature 204 may be coupled to the rotor 104 of the wind turbine 100 via the shaft 116 or via both the shaft 116 and the gear box. Consequently, the annular rotating armature 204 may be rotated due to the rotations of the rotor 104 caused due to the wind energy. Due to the rotations of the annular rotating armature 204, the superconducting generator 200 may generate electrical power by virtue of the voltage induced in armature winding as they move past the magnetic field established by the superconducting field winding 208.

Figure 5:
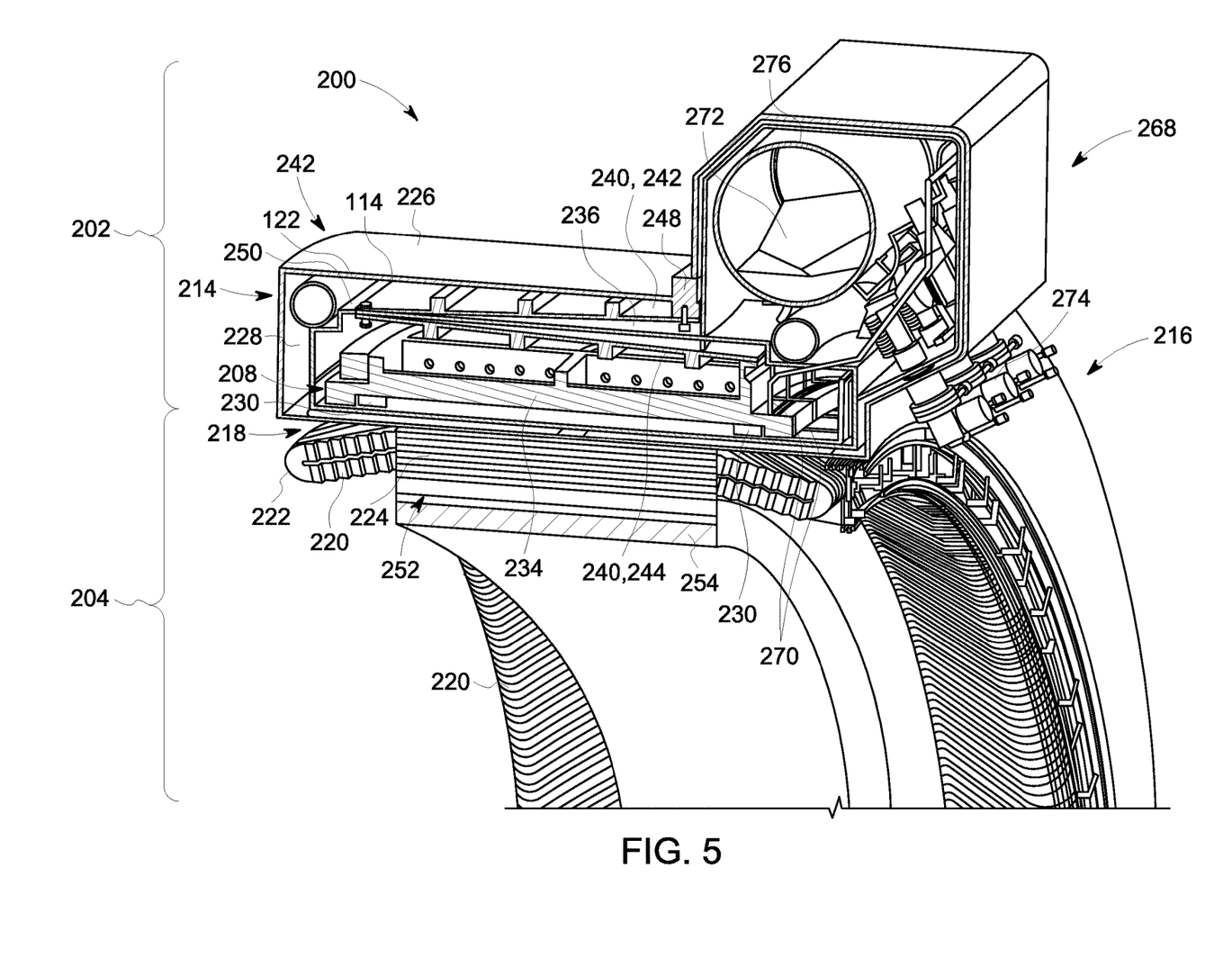
FIG. 5 is a schematic cross-sectional isometric view of a portion of the superconducting generator of FIG. 4, taken along line 5-5, in accordance with one or more embodiments shown or described herein.
Figure 6:
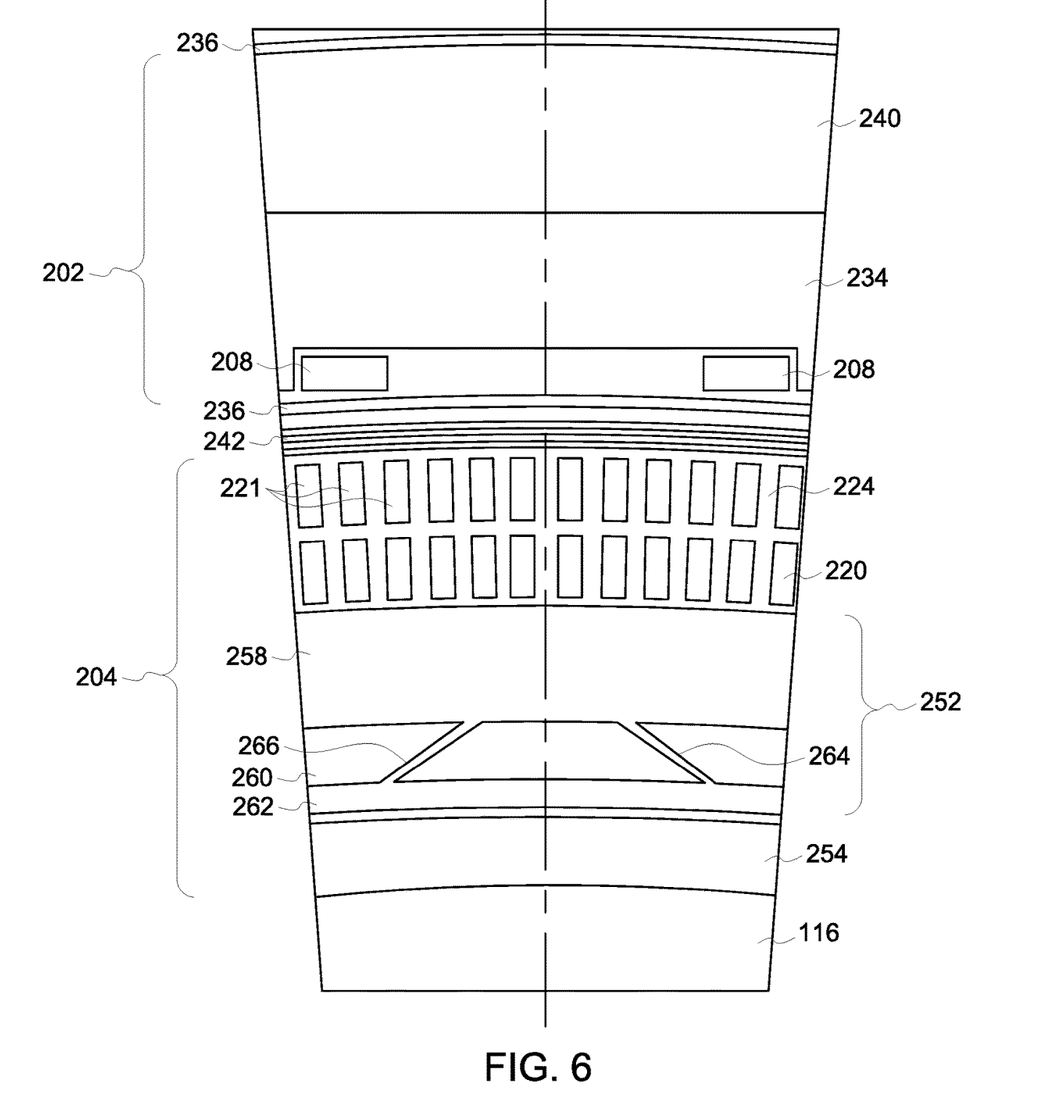
FIG. 6 is a schematic cross-sectional view of a portion of the superconducting generator of FIG. 4, taken along line 6-6, in accordance with one or more embodiments shown or described herein.

Turning now to FIGS. 5 and 6, illustrated is a schematic isometric cross-section of the superconducting generator 200 of FIG. 4, taken along line 5-5 and 6-6, respectively, in accordance with one embodiment of the present disclosure. As previously asserted, the superconducting generator 200 may be representative of one embodiment of the superconducting generator 114 in the wind turbine 100 of FIG. 1. The superconducting generator 200 includes a hub end 214 coupled to the hub 110 (FIG. 1) and a non-hub end 216 coupled to the tower 108 (FIG. 1). The superconducting generator 200 includes the stationary field 202 disposed concentrically outside the annular rotating armature 204. The stationary field 202 and the annular rotating armature 204 are separated by an air gap 218.

The annular rotating armature 204 includes a conductive armature winding 220 (e.g., coils or bars) arranged longitudinally along the length of the annular rotating armature 204 and on an inside cylindrical surface of the annular rotating armature 204. In the exemplary embodiment, the conductive armature winding 220 is coupled at their opposite ends to one another by conductive end turns 222. Referring more specifically to FIG. 6, the conductive armature winding 220 includes a plurality of coils that are hereinafter collectively referred to as coils 221. Although, twelve coils are depicted in the cross-sectional view of FIG. 6, any number of coils may be employed in the annular rotating armature 204, without limiting the scope of the present specification. The coils 221 would be configured into phase windings, the number of which are determined by the designer. Non-limiting examples of the electrically conductive materials used to form the coils 221 may include copper, aluminum, silver, gold, or combinations thereof.

In some embodiments, as depicted in FIG. 6, the coils 221 are spaced apart from each other. For example, each coil of the plurality of coils 221 is spaced apart from adjacent coils. The space between adjacent coils 221 may act as or be utilized as cooling ducts, where a cooling fluid such as air may be passed therethrough. Advantageously, the configuration of the annular rotating armature 204 as depicted in FIGS. 5 and 6 aids in lowering operating temperature of the armature 204. Also, in certain embodiments, the coils 221 may be coated with electrically insulating coating so that flow of the cooling fluid may not impact electrical operation of the superconducting generator 200.

In the embodiment of FIGS. 5 and 6, the conductive armature winding 220 is shown as arranged in a double-layer lap distributed configuration. However, without limiting the scope of the present specification, the conductive armature winding 220 may be arranged in various other configurations including, but not limited to, multi-layer winding, integral slot winding, integral slot chorded winding, fractional pitched coil winding, full pitched coil winding, single layer winding such as half-coil concentric winding or whole-coil concentric winding, mush winding, fractional slot winding, fractional slot concentrated winding, distributed winding, helical winding, or combinations thereof. Moreover, the conductive armature winding 220 may be a single-phase winding or a multi-phase winding, for example, a three-phase winding.

The annular rotating armature 204 further includes a coil support structure 224 that supports the conductive armature winding 220. An outer surface of the coil support structure 224 is fixed to a cylindrical housing. The cylindrical housing rotates along with the annular rotating armature 204.

The stationary field 202 includes an annular housing 226, defining a vacuum enclosure 228, and a plurality of components disposed within the annular housing 226. The annular housing 226 and the plurality of components disposed therein form a cryostat 242.

More particularly, disposed within the annular housing 226 is a superconducting field winding 208 comprised of a plurality of race track or oval shaped coils 230 and a field coil former 234 that carries or mechanically supports the individual field coils 230. The vacuum enclosure 228 is formed around a thermal shield 236 and the superconducting field winding 208. In the illustrated embodiment, the thermal shield 236 may be disposed inside the vacuum enclosure 228 such that the thermal shield 236 encloses the superconducting field winding 208 and aids in maintaining the temperature of the superconducting field winding 208 to the cryogenic temperatures.

In an embodiment, the thermal shield 236 is suspended in the vacuum enclosure 228 via a dual torque tube assembly 240. The torque tube assembly 240 is configured to thermally isolate the superconducting field winding 208 and to receive torque experienced by the superconducting field winding 208. More particularly, during an operation of the superconducting generator 200, a reaction torque may be generated as a result of an interaction between a magnetic field produced by the stationary field 202 and a magnetic field produced by the annular armature 204. The torque tube assembly 240 is configured to support the reaction torque caused due to the interaction between the magnetic field produced by the stationary field 202 and a magnetic field produced by the annular rotating armature 204.

In the illustrated embodiment, the torque tube assembly 240 comprises a first torque tube 244 positioned within the thermal shield 236 and a second torque tube 246 coupled to the first torque tube 244 and positioned outside of the thermal shield 236. The torque tube assembly 240 is mounted on an annular flange 248 and coupled to the housing 226. Another flange 250 is provided at another end of the torque tube assembly 240 to facilitate elevating the thermal shield 236 from the torque tube assembly 240, and more particularly to keep the thermal shield 236 at an equal distance between the field coil former 234 and the superconducting field winding 208. One end of the torque tube assembly 240 is supported by the flange 250 against an inner wall of the thermal shield 236.

In an embodiment, the plurality of race track or oval shaped coils 230 are usually wound from superconducting wire or tape, such as (but not limited to) niobium-titanium superconducting wire. A typical range of vacuums within the vacuum enclosure 228 is between generally $1.10^{-0.5}$ mbar.

To enhance magnetic coupling between the stationary field winding 208 and the conductive armature winding 220, a partitioned magnetic shield 252 is disposed between the conductive armature winding 220 and an armature support structure 254. The armature support structure 254 is configured to transmit mechanical loads from the conductive armature winding 220 to the rotating shaft 116 (FIG. 1). In an embodiment, the armature support structure 254 is formed of steel. With steel being an electrical conductor, any magnetic field emerging from the magnetic shield 252 can induce eddy current losses in the armature support structure 254. These losses can be substantial and can dramatically impact the performance of the machine. Accordingly, the magnetic shield 252 as disclosed herein has increased control over the magnetic field that is seen by the armature support structure 254 and the associated dissipation therein. In addition, the magnetic shield 252 limits the electromagnetic loss in the armature support structure 254. By enhancing the coupling between the stationary field winding 208 and the conductive armature winding 220 higher efficiency, higher power density and lower costs are achieved.

It will be appreciated that making the magnetic shield 252 thicker will reduce the loss within the armature support structure 254, but at the expense of making the magnetic shield 252 heavier. Accordingly, the magnetic shield 252 is comprised of a first magnetic shield ring 258 and a second magnetic shield ring 262. The first magnetic shield ring 258 and second magnetic shield ring 262 are concentric and include an air gap 260 therebetween. The air gap 260 reduces eddy current loss by encouraging the magnetic field to remain in the first magnetic shield ring 258. Any magnetic field that passes through the first magnetic shield ring 258 is addressed by the second magnetic shield ring 262 and remains therein, thereby keeping any residual magnetic flux from penetrating into the armature support structure 254 where it can generate substantial eddy current loss.

The magnetic shield 252 further includes a magnetic shield bridge link 264 disposed within the air gap 260 in a manner to couple the first magnetic shield ring 258 to the second magnetic shield ring 262. Coupling the first magnetic shield ring 258 and the second magnetic shield ring 262 allows for the magnetic shield 252 to be handled as a single piece during assembly. In an embodiment the magnetic shield bridge link 264 is configured as a laminated structure, integrally formed with the first magnetic shield ring 258 and the second magnetic shield ring 262. In another embodiment, the magnetic shield bridge link 264 is formed of a plurality of structural members. In yet another embodiment, the magnetic shield bridge link 264 is integrally formed with one of the first magnetic shield ring 258 or the second magnetic shield ring 262.

The design of the magnetic shield bridge link 264 with the first magnetic shield ring 258 and the second magnetic shield ring 262 is driven by magnetic and structural considerations. It is desirable for the magnetic shield bridge link 264 to be heavily saturated so the magnetic shield bridge link 264 does not encourage magnetic flux to travel from the first magnetic shield ring 258 to the second magnetic shield ring 262, suggesting a thin magnetic shield bridge link 264 is more desirable than a thick magnetic shield bridge link 264. However, all of the torque created at the armature windings 220 must be transmitted to the armature support structure 254 through the magnetic shield bridge link 264, implying the magnetic shield bridge link 264 must have adequate cross-section to support the developed torque. In addition, the magnetic shield bridge link 264 must support the gravity loads created by the first magnetic shield ring 258 and the armature winding 220. As illustrated, the magnetic shield bridge link 264 is comprised of a plurality of structural bridge components 266. A diagonal deployment of each of the structural bridge components 255 is beneficial in that it forms a truss-like structure to support the mechanical loads and the diagonal shape created, forms a longer path for any magnetic field that is attempting to transition from the first magnetic shield ring 258 to the second magnetic shield ring 262. The longer path discourages the flow of any magnetic field.

In an embodiment, the first magnetic shield ring 258 should be sufficiently thick to maintain required torque as well as suppress the eddy current loss of the armature support structure 254. In an embodiment, a radial dimension of the second magnetic shield ring 262 is less than a radial dimension of the first magnetic shield ring 258. In addition, the thinner the magnetic shield bridge link 264, and more particularly, a radial dimension between the second magnetic shield ring 262 and the first magnetic shield ring 258, the lower the eddy current loss of the armature support structure 254. The radial dimension (thickness) of the magnetic shield bridge link 264 will be a trade-off between structural strength and the eddy current loss. It has been found that the thinner the magnetic shield bridge link 264, the lower the eddy current loss in the armature support structure 254. In an embodiment, the first magnetic shield ring 258 and second magnetic shield ring 262 would be made from ferromagnetic material, such as electrical sheet steel of the type found in conventional motors and generators. In an embodiment, the magnetic shield bridge link 264 would be made of a non-magnetic, non-conducting material so that it behaves like air to the magnetic fields impinging on it. In an embodiment, it will be appreciated that part count and assembly of the magnetic shield are simplified by making the first magnetic shield ring 258, the second magnetic shield ring 262, and the bridge link 264 out of the same ferromagnetic material such as by stamping laminations that simultaneously form all three parts. It will be appreciated that the first and second magnetic shield rings 258 and 262, respectively, may include elements that support assembly of the armature 204. For example, second magnetic shield ring 262 may include features that protrude inwardly that are intended to be inserted into slots in the outer periphery of the armature support structure 254. These features in the second magnetic shield ring 262 and armature support structure 254 could be dovetails or another shape that positively locks the magnetic shield 252 to the armature structure 254.

The superconducting generator 200 further includes a cooling assembly 268 for cooling and maintaining the superconducting field winding 208 at cryogenic temperatures. The cooling assembly 268 may include a plurality of conduits 270 for receiving a cryogenic liquid 272, for example liquid helium and one or more cryocoolers 274, indirectly coupled to the superconducting field winding 208 and the torque tube assembly 240. A tank 276 is typically used to store the cryogenic liquid 272. Although the stationary field 202 is shown as including a single tank 276, use of two or more than two such tanks for holding the cryogenic liquid 272 is also envisioned within the scope of the present disclosure. Non-limiting examples of the cryogenic liquid 272 may include any type of gaseous or condensed cooling fluids, such as the previously mentioned liquid helium. The conduits 270 may be disposed annularly inside the vacuum enclosure 228 and fluidly coupled to the tank 276. The conduits 270 are configured to facilitate flow of the cryogenic liquid 272 within the stationary field 202. The cryogenic liquid 272 is fed around the superconducting field winding 208 so as to cool the superconducting field winding 208 to achieve a superconducting condition for the superconducting field winding 208. In particular, the cryogenic liquid 272 passively circulates annularly inside the stationary field 202 through the conduits 270, driven by density gradients and phase change. While being circulated, the cryogenic liquid 272 removes any heat deposited onto or into the low-temperature structure and the superconducting field winding 208 (such as from radiation or conduction heat transfer or from eddy current heating created by generator operation), thereby maintaining the superconducting field winding 208 at the cryogenic temperatures.

The cooling assembly 268 is further configured to retain and take up the torque, as well as bear the weight of the superconducting generator 200. In addition, the cooling assembly 268 is configured to insulate the warm end of the torque tube assembly 240 from the superconducting field winding 208 so that superconducting field winding 208 is cooled to near absolute zero (e.g., 4 K).

By way of example, in some embodiments, when the superconducting generator 200 is deployed as the superconducting generator 114 in a wind turbine, such as the wind turbine 100 of FIG. 1, the annular rotating armature 204 may be coupled to the rotor 104 (FIG. 1) of the wind turbine via the shaft 116 (FIG. 1) or via both the shaft 116 and a gear box (not shown). Consequently, the annular rotating armature 204 may be rotated due to the rotations of the rotor 104 caused due to the wind energy. Due to the rotations of the annular rotating armature 204, the superconducting generator 200 may generate electrical power by virtue of the voltage induced in the conductive armature winding 220 as they move past the magnetic field established by the stationary field 202.

During operation torque is applied by the turbine 100 to rotate the annular rotating armature 204 around the stationary field 202. Torque is applied from the annular rotating armature 204 to the stationary field 202 due to electromagnetic force coupling. The torque applied to the stationary field 202, is transmitted by the cryostat housing 226 to a mount (not shown). As previously indicated, in another embodiment, the annular rotating armature 204 is stationary and the stationary field 202 is rotatable.

Figure 7:
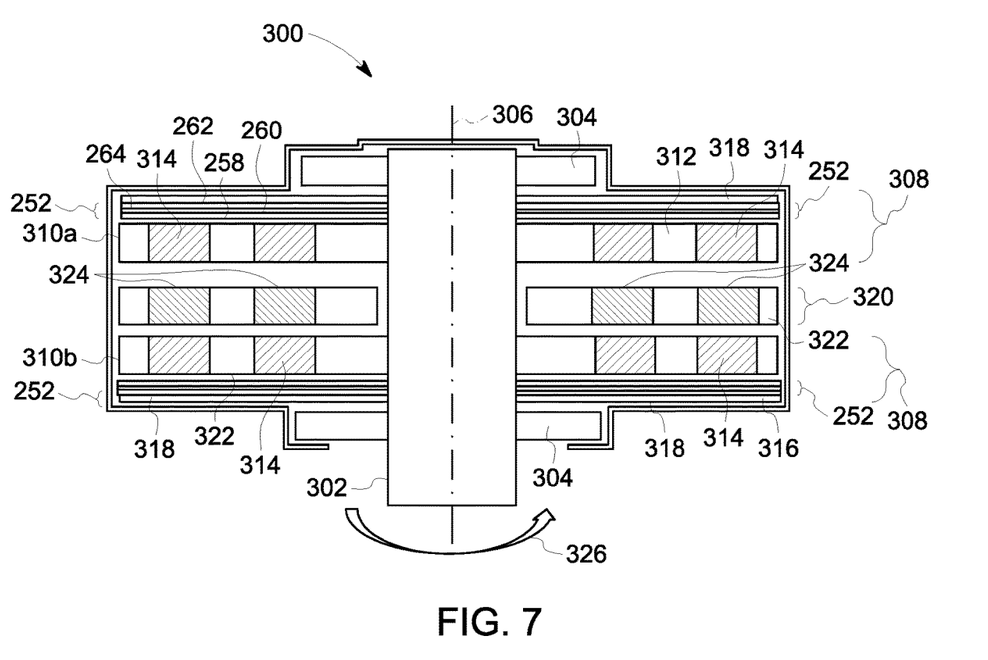
FIG. 7 is a schematic diagram of another embodiment of a superconducting generator illustrating a magnetic shield, in accordance with one or more embodiments of the present disclosure.

Referring now to FIG. 7, as previously mentioned, the use of a magnetic shield to enhance magnetic coupling is applicable to both radial flux and axial flux machines. Accordingly, FIG. 7 illustrates in simplified cross-sectional view, an exemplary embodiment of an axial flux electrical machine 300. The machine 300 may operate as a motor and/or as a generator as desired. As shown, the machine 300 includes a shaft 302 and a plurality of bearings 304, enabling rotation of the shaft 302 about an axis 306. For the exemplary embodiment shown in FIG. 7, the shaft 302 is formed of a high strength material. Example shaft materials include, but are not limited to, steel alloys. Non-limiting examples of the shaft include monolithic constructions and dual or multi-alloy constructions.

The machine 300 includes a rotor assembly (armature) 308 rotationally engaged with the shaft 302 and having a pair of rotor disks 310a, 310b formed of a magnetic material. A wide variety of magnetic materials can be used to form the rotor disks 310a, 310b, non-limiting examples of which include magnetic steel, iron-cobalt alloys, and silicon iron. In machines with high magnetic fields, it may be desirable to eliminate ferromagnetic materials from the rotor disks 301a, 310b. The rotor disks 310a, 310b comprise laminated structures, including a conductive armature winding 312, comprising a plurality of conductive armature coils 314 and a coil support structure 316, an armature support structure 318 and a magnetic shield 252 disposed between the conductive armature winding 312 and the armature support structure 318. The magnetic shield 252, as described herein, reduces eddy current losses from the changing magnetic fields. The rotor disks 310a, 310b are coupled to the shaft 302 for rotation about axis 306 and generation of electromagnetic torque.

The machine 300 further includes a stator assembly (stationary field) 320 including a stationary superconducting field winding 322 comprising a plurality of field coils 324. Beneficially, by positioning the stationary superconducting field coils 324 in the stator assembly 318, the stationary superconducting field coils 324, and more particularly, the superconducting field winding 322 is mechanically decoupled from the rotor assembly 308. The stationary superconducting field coils 324 and the plurality of conductive armature coils 314 are configured relative to each other such that the substantially axial airgap flux produced by the rotor segments 310a, 310b couple with the stator assembly 320 to produce torque around the predetermined axis 306.

Similar to the magnetic shield 252 of FIG. 6, the magnetic shield 252 of the axial flux machine 300 includes a first magnetic shield ring 258, a second magnetic shield ring 262, a magnetic shield bridge link 264 and an air gap 260. The design of the magnetic shield bridge link 264, the first magnetic shield ring 258 and the second magnetic shield ring 262 is driven by magnetic and structural considerations. The magnetic shield 252, and more particularly, the first magnetic shield ring 258, in the axial flux machine 300 is configured having a sufficient axial dimension (thickness) near the plurality of conductive armature coils 314 to maintain required torque as well as suppress the eddy current loss of the armature support structure 318. The magnetic shield bridge link 264 supports all of the torque created at the conductive armature winding 312 to be transmitted through the magnetic shield bridge link 264, implying the magnetic shield bridge link 264 must have adequate cross-section to support the developed torque. In addition, the magnetic shield bridge link 264 must support the gravity loads created by the first magnetic shield ring 258 and the conductive armature winding 312. Yet, the thinner the magnetic shield bridge link 264 the lower the eddy current loss. Accordingly, the axial dimension (thickness) of the magnetic shield bridge link 264 will be a trade-off between structural strength and the eddy current loss. As previously described with reference to FIG. 6, the magnetic shield bridge link 264 is comprised of a plurality of structural bridge components (not shown in FIG. 7), generally similar to the structural bridge components 266 of FIG. 6. The plurality of structural bridge components are oriented in the tangential direction for the axial flux machine 300, and more particularly, adapted to align with the direction of a torque-producing force 326 and having a generally truss-like structure as previously described.

Figure 8:
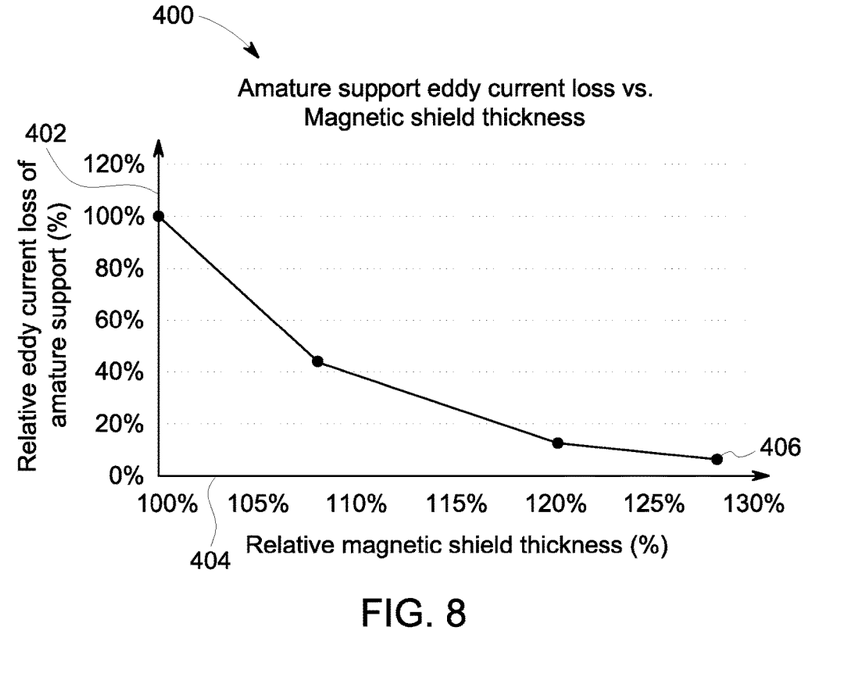
FIG. 8 is a graph illustrating the relative eddy current loss in an armature support structure of a known one-piece or solid magnetic shield design.

FIG. 8 shows a graph 400 illustrating the relative eddy current loss in an armature support structure of a known one-piece or solid magnetic shield design. In the illustrated embodiment, the relative eddy current loss (%) in the armature support structure is plotted along a y-axis 402 and a relative magnetic shield thickness (%) is plotted along an x-axis 404. It should be noted herein that the values shown along the x-axis 404 and the y-axis 402 relate to one embodiment of a known armature support structure with representative relative eddy current losses and having a relative radial dimension (thickness). It is understood that these values may change depending on the cross-sectional dimensions of the overall structure. While such changes may quantitatively affect the values shown in the graph 400, the qualitative characteristics of the graph 400 may remain the same. To meet machine design requirements, a thickness of the magnetic shield is required to increase from nominal 100% to approximately 128% in order to reduce the eddy current loss of armature support to about 6%, as plotted at point 406.

As illustrated, the radial dimension, or thickness, of the known one-piece or solid magnetic shield must be increased substantially to reduce the eddy current loss in the armature support structure to an acceptable level. The increased radial dimension of the known one-piece or solid magnetic shield reduces the magnetic field seen by the armature support structure, but at the expense of making the magnetic shield much heavier due to the increased radial dimension. The partitioned magnetic shield design disclosed herein is effective in reducing the loss in the armature support structure without incurring the weight penalty of a one-piece or solid magnetic shield design.

In accordance with the embodiments described herein, an improved wind turbine such as the wind turbine 100 and an improved superconducting generator such as the superconducting generator 114, 200, 300 are provided. The improvements in the wind turbine 100 and the superconducting generator 114, 200, 300 may be achieved, at least partially, due to an enhanced configuration of the annular rotating armature in accordance with some embodiments of the present specification.

As noted earlier, disclosed is an annular rotating armature including a partitioned magnetic shield disposed between the conductive armature winding and an armature support structure. As a first objective of this design, the partitioned magnetic shield controls the magnetic field that is seen by the armature support structure and the associated dissipation therein. As a second objective, the partitioned magnetic shield limits the electromagnetic loss in the armature support structure. By partitioning the magnetic shield into first and second rings serves to separately resolve the two objectives for the magnetic shield and maintains the machine efficiency as high as possible. Connecting the first magnetic shield ring and the second magnetic shield ring via the magnetic shield bridge link simplifies the manufacture of the magnetic shield by holding the two rings relative to each other.

The multi-piece or partitioned magnetic shield disclosed herein provides reduced weight penalty associated with limiting the losses in the armature support structure. In addition, the first and second magnetic shield rings that are coupled via the magnetic shield bridge link can be fabricated easily by stamping the magnetic shield laminations. Features may be included on the magnetic shield to provide attachment to the armature support structure. The magnetic shield design disclosed herein provides for higher machine efficiency and lower machine weight, resulting in a more valuable machine.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

The invention claimed is:

1. An armature for an electrical machine, comprising:
an armature support structure;
an armature winding comprising a plurality of coils, the armature winding disposed relative to the armature support structure; and
a magnetic shield disposed concentric to the armature support structure, wherein the magnetic shield is disposed between the armature winding and the armature support structure, the magnetic shield comprising:
a first magnetic shield ring;
a second magnetic shield ring disposed concentric to the first magnetic shield ring, the first magnetic shield ring disposed a distance from the second magnetic shield ring to define an air gap therebetween; and
a magnetic shield bridge link disposed in the air gap and coupled to the first magnetic shield ring and the second magnetic shield ring.

2. The armature as claimed in claim 1, wherein the armature support structure is formed of steel.

3. The armature as claimed in claim 1, wherein the first magnetic shield ring, the second magnetic shield ring and the magnetic shield bridge link are formed of ferromagnetic steel designed for use in electrical equipment.

4. The armature as claimed in claim 1, wherein a radial dimension of the second magnetic shield ring is less than a radial dimension of the first magnetic shield ring.

5. The armature as claimed in claim 1, wherein the magnetic shield is formed as a laminated structure.

6. The armature as claimed in claim 1, wherein the magnetic shield bridge link is a laminated structure, integrally formed with at least one of the first magnetic shield ring and the second magnetic shield ring.

7. The armature as claimed in claim 1, wherein the magnetic shield bridge link comprises a plurality of structural bridge components coupled to the first magnetic shield ring and the second magnetic shield ring.

8. An electric machine, comprising:
a stationary field;
a superconducting field winding disposed on the stationary field; and
an armature disposed concentric to the stationary field, wherein the armature comprises:
an armature winding comprising a plurality of coils, wherein each coil of the plurality of coils is spaced apart from adjacent coils;
an armature support structure, the armature winding disposed concentric to the armature support structure; and
a magnetic shield disposed concentric to the armature support structure, wherein the magnetic shield is disposed between the armature winding and the armature support structure, the magnetic shield comprising:
a first magnetic shield ring;
a second magnetic shield ring disposed concentric to the first magnetic shield ring and coupled to the first magnetic shield ring via a magnetic shield bridge link; and
an air gap formed between the first magnetic shield ring and the second magnetic shield ring, the magnetic shield bridge link disposed within the air gap.

9. The electric machine as claimed in claim 8, wherein the armature support structure is formed of steel.

10. The electric machine as claimed in claim 8, wherein the first magnetic shield ring, the second magnetic shield ring and the magnetic shield bridge link are formed of ferromagnetic steel designed for use in electrical equipment.

11. The electric machine as claimed in claim 8, wherein the electric machine is one of a radial flux electric machine or an axial flux electric machine.

12. The electric machine as claimed in claim 8, wherein the magnetic shield is formed as a laminated structure.

13. The electric machine as claimed in claim 8, wherein the magnetic shield bridge link is a laminated structure, integrally formed with at least one of the first magnetic shield ring and the second magnetic shield ring.

14. A wind turbine, comprising:
a rotor comprising a plurality of blades;
a shaft coupled to the rotor; and
a super-conducting generator coupled to the rotor via the shaft and configured to be operated via the rotor, wherein the superconducting generator comprises:
a stationary field;
a superconducting field winding disposed on the stationary field; and
an armature disposed concentric to the stationary field, wherein the armature comprises:
an armature winding comprising a plurality of coils, wherein each coil of the plurality of coils is spaced apart from adjacent coils;
an armature support structure, the armature winding disposed concentric to the armature support structure; and
a magnetic shield, wherein the magnetic shield is disposed between the armature winding and the armature support structure, the magnetic shield comprising:
a first magnetic shield ring;
a second magnetic shield ring disposed concentric to the first magnetic shield ring and coupled to the first magnetic shield ring via a magnetic shield bridge link; and
an air gap formed between the first magnetic shield ring and the second magnetic shield ring, the magnetic shield bridge link disposed within the air gap.

15. The wind turbine as claimed in claim 14, wherein the armature support structure is formed of steel.

16. The wind turbine as claimed in claim 14, wherein the first magnetic shield ring, the second magnetic shield ring and the magnetic shield bridge link are formed of ferromagnetic steel designed for use in electrical equipment.

17. The wind turbine as claimed in claim 14, wherein the super-conducting generator is one of a radial flux super-conducting generator or an axial flux super-conducting generator.

18. The wind turbine of claim 14, wherein the magnetic shield bridge link comprises a plurality of structural bridge components coupled to the first magnetic shield ring and the second magnetic shield ring.

19. The wind turbine of claim 14, wherein the magnetic shield is formed as a laminated structure.

20. The wind turbine of claim 14, wherein the magnetic shield bridge link is a laminated structure, integrally formed with at least one of the first magnetic shield ring and the second magnetic shield ring.

* * * * *